United States Patent
Adil et al.

(10) Patent No.: US 11,052,379 B1
(45) Date of Patent: Jul. 6, 2021

(54) TITANIA-SUPPORTED MIXED METAL OXIDE CATALYST

(71) Applicant: KING SAUD UNIVERSITY, Riyadh (SA)

(72) Inventors: Syed Farooq Adil, Riyadh (SA); Mohammed Rafiq Hussain Siddiqui, Riyadh (SA); Saad Hamad Alabbad, Riyadh (SA); Abdurrahman Abdullah Al-Warthan, Riyadh (SA); Mujeeb Yousuf Khan, Riyadh (SA); Mufsir Kuniyil, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 16/932,909

(22) Filed: Jul. 20, 2020

(51) Int. Cl.
*B01J 23/889* (2006.01)
*B01J 21/06* (2006.01)
*C11C 3/00* (2006.01)
*B01J 35/02* (2006.01)
*B01J 23/00* (2006.01)

(52) U.S. Cl.
CPC ......... *B01J 23/8892* (2013.01); *B01J 21/063* (2013.01); *B01J 23/002* (2013.01); *B01J 35/023* (2013.01); *C11C 3/003* (2013.01)

(58) Field of Classification Search
CPC .... B01J 23/8892; B01J 21/063; B01J 23/002; B01J 35/023; C11C 3/003
See application file for complete search history.

(56) References Cited

U.S. PATENT DOCUMENTS

| 7,563,915 B2 | 7/2009 | Matson et al. |
| 8,633,132 B2 | 1/2014 | Lee et al. |
| 9,957,464 B2 | 5/2018 | Slade et al. |

FOREIGN PATENT DOCUMENTS

WO  2016119140 A1  8/2016

OTHER PUBLICATIONS

Ouaguenouni et al., "Preparation and catalytic activity of nickel-manganese oxide catalysts in the reaction of partial oxidation of methane," Comptes Rendus Chimie, 12.6-7 (2009): 740-747.
Wen et al., "Biodiesel production from waste cooking oil catalyzed by TiO2—MgO mixed oxides," Bioresource technology, 101.24 (2010): 9570-9576.
Borges et al., "Recent developments on heterogeneous catalysts for biodiesel production by oil esterification and transesterification reactions: A review," Renewable and Sustainable Energy Reviews, 16.5 (2012): 2839-2849.
Gombotz et al., "MnO and TiO solid catalysts with low-grade feedstocks for biodiesel production," Fuel, 92.1 (2012): 9-15.
Madhuvilakku, et al., "Biodiesel synthesis by TiO2—ZnO mixed oxide nanocatalyst catalyzed palm oil transesterification process," Bioresource Technology, 150 (2013): 55-59.

*Primary Examiner* — James A Fiorito
(74) *Attorney, Agent, or Firm* — Nath, Goldberg & Meyer; Richard C. Litman

(57) ABSTRACT

A mixed metal oxide catalyst includes NiMnO nanoparticles on a $TiO_2$ nanoparticle support. The catalyst may be used to produce biodiesel from waste oils, such as used cooking oils, through a transesterification reaction. The process of producing biodiesel using waste oils using the mixed metal oxide catalyst eliminates a need for quenching, reduces issues related to saponification and glycerol recovery, and allows for easy recovery and reuse of the mixed metal oxide catalyst in an economical and environmentally friendly way.

3 Claims, 20 Drawing Sheets

US 11,052,379 B1

TITANIA-SUPPORTED MIXED METAL OXIDE CATALYST

BACKGROUND

1. Field

The disclosure of the present patent application relates to a catalyst for transesterification reactions, and particularly to a catalyst comprising NiMnO supported on titania and methods for its preparation and use in preparing biodiesel.

2. Description of the Related Art

Emissions of greenhouse gases from burning of fossil fuels drive a need for suitable alternatives to fossil fuels from renewable resources that are environmentally benign. Alternative fuels must be technically feasible, economically competitive, non-toxic and readily available. One possible alternative to fossil fuel is biodiesel fuel. Biodiesels belong to a class of fatty acid methyl esters, which are biodegradable, non-toxic, and have considerably low emission. Natural feedstocks, such as vegetable oils and animal fats, can be converted to biodiesel through a transesterification process in the presence of suitable catalysts. However, such feedstocks for biodiesel to replace fossil fuel are problematic due to their high viscosity, low volatility, incomplete combustion and possible toxic acrolein formation. Several methods exist to overcome these problems, particularly that of high viscosity, including direct use and blending, micro emulsions, thermal cracking (pyrolysis) and transesterification.

Biodiesel is presently produced commercially by transesterification of vegetable oils with alcohol, such as methanol or ethanol. However, since the direct use of alcohols as fuel causes corrosion of various parts of an engine, the transesterification of vegetable oils with alcohols is not ideal. Additionally, biodiesel produced by transesterification of vegetable oils with alcohols is more expensive than hydrocarbon-based diesel fuels. Moreover, large-scale production of biodiesel from vegetable oils may seriously affect agricultural production of essential crops, which may lead to food shortages and price increases.

To reduce the cost of biodiesels and to limit the effect on food supply, non-edible oils, such as Jatropha Curcas (ratanjyot), Pongamia Pinnatta (karanj), Calophyllum Inophyllum (nagchampa), Hevca Brasiliensis (rubber), have been considered. However, non-edible oils also suffer from various shortcomings, including high contents of free fatty acids (FFA) and production of lower oil yields from crops. To reduce the contents of FFA from non-edible oils requires a two-step process and the lower oil yield may seriously increase the cost of production. Therefore, still other alternatives should be considered.

Annually, a substantial amount of used cooking oil is generated worldwide. The cost of acquiring used cooking oil is generally lower than fresh edible oil, as a major factor contributing to the cost lies in the collection and purifying processes. Further, waste oil is generally discarded into drains or sewers, leading to blockage of water transport systems and pollution of water resources. As such, productive uses of used cooking oil are desired.

Transesterification of vegetable oils is usually carried out using a homogeneous basic catalyst, such as KOH or NaOH, at mild temperatures. Homogeneous acid catalysts, such as HCl and $H_2SO_4$, may be applied, particularly to produce triglycerides from inedible oils. However, homogeneous catalysts often require long transesterification reaction times, and suffer from problems of saponification and corrosion. Further, recovery of the homogeneous catalysts after the reaction is costly and time consuming. Heterogeneous catalysts (e.g., solid catalysts) are more easily recovered, less expensive, more available, possess longer durability, easier to regenerate and more stable at high temperatures and pressures relative to homogeneous catalysts.

Existing solid catalysts have been used primarily for transesterification of fresh vegetable, non-edible plant or animal oils and fats.

Thus, a catalyst for transesterification of oils, particularly waste cooking oils, solving the aforementioned problems are desired.

SUMMARY

The present disclosure is directed to a titania-supported mixed metal oxide catalyst for transesterification reactions. In a particular embodiment, the mixed metal oxide is NiMnO.

A method for preparing the mixed metal oxide nanoparticle catalyst includes the steps of mixing a Ni salt and a Mn salt with $TiO_2$ in solution, adjusting the pH of the mixture to a basic pH; heating the pH adjusted mixture for a first incubation time; collecting a precipitate; and calcining the precipitate to produce the catalyst.

The present disclosure is also directed to providing a method for preparing a biodiesel fuel comprising mixing a fatty acid source with an alcohol at a molar ratio, adding the catalyst to the mixture, heating the mixture after adding the catalyst, cooling the mixture, removing the catalyst from the mixture; and isolating the biodiesel product.

These and other features of the present subject matter will become readily apparent upon further review of the following specification.

$TiO_2$; b) NiMnO (5%)-$TiO_2$ at 300° C.; c) NiMnO (5%)-$TiO_2$ at 400° C.; and d) NiMnO (5%)-$TiO_2$ 500° C.

Figure 12:
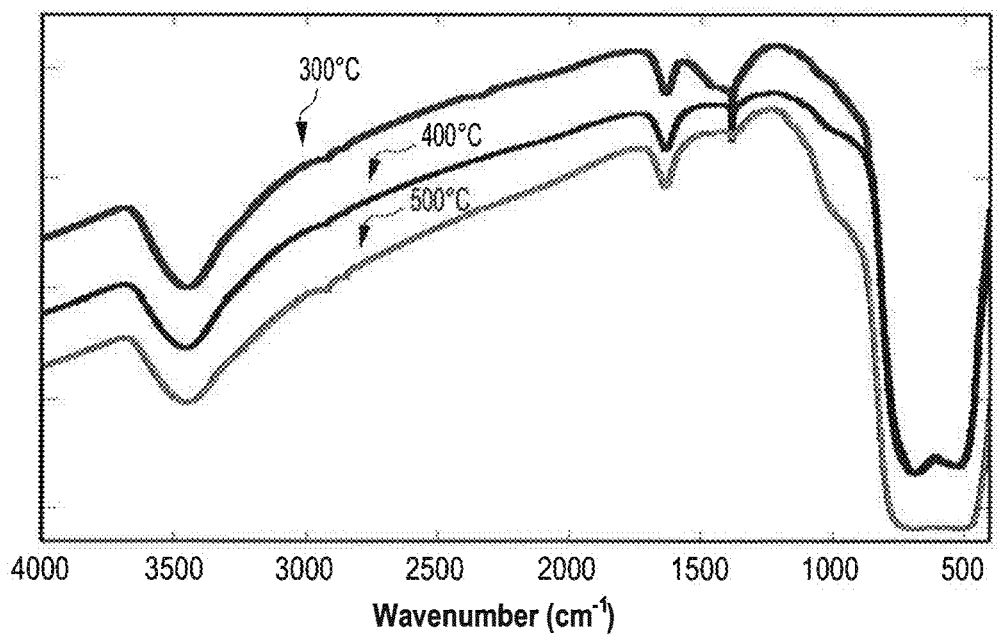

FIG. 12 provides comparisons of Fourier Transform infrared spectroscopy (FT-IR) spectrum of the synthesized catalyst NiMnO(5%)-$TiO_2$ calcined at different temperatures 300° C., 400° C. and 500° C.

Figure 13:
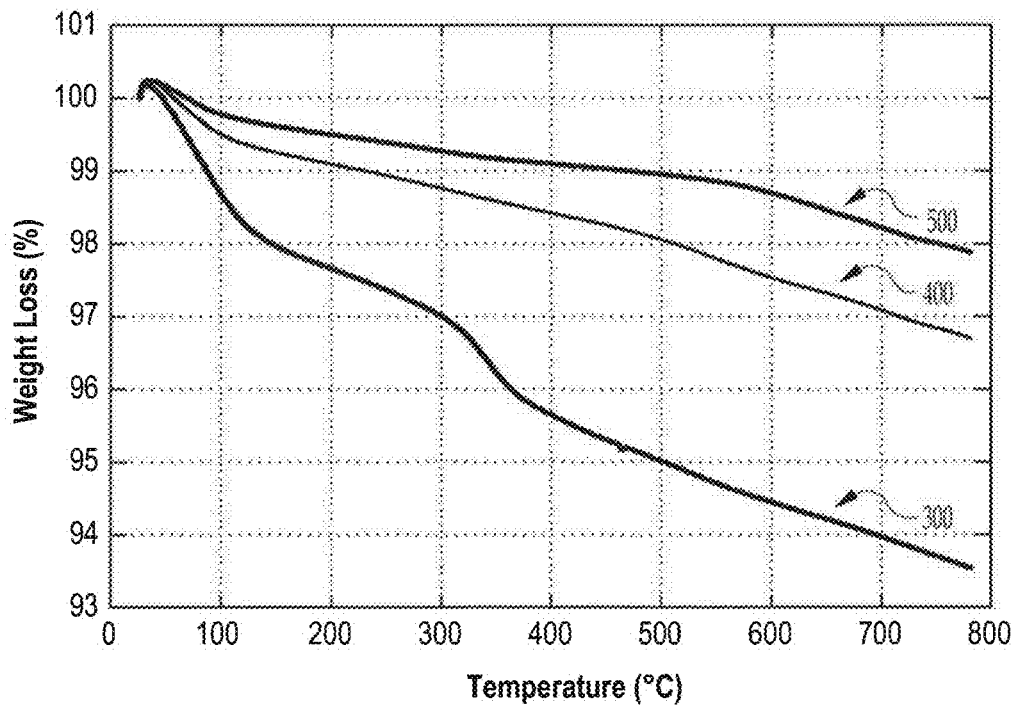

FIG. 13 depicts the thermogravimetric analysis (TGA) curves of the synthesized catalyst NiMnO (5%)-$TiO_2$ calcined at different temperatures such as 300° C., 400° C. and 500° C.

Figure 14:
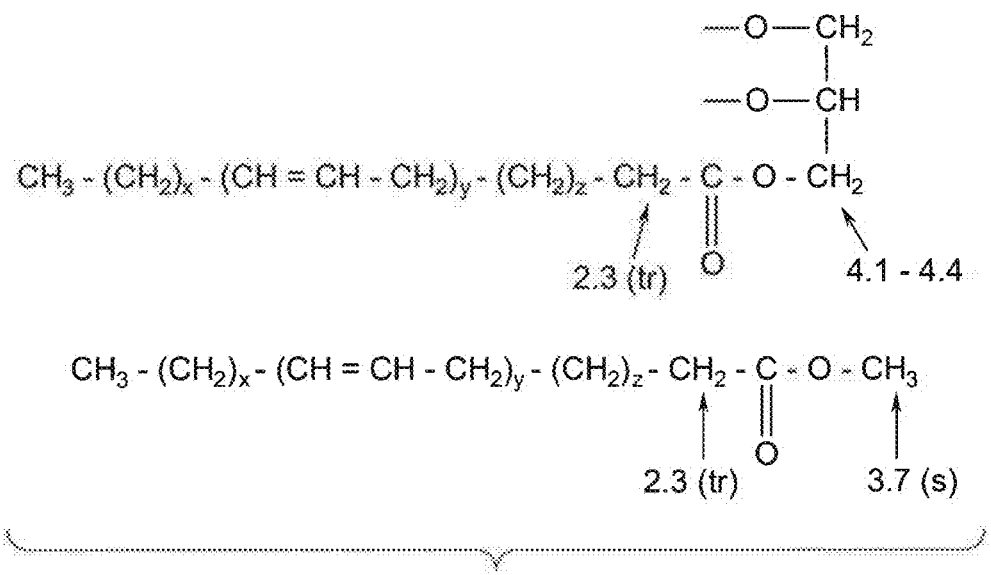

FIG. 14 schematizes the proposed chemical shifts of protons in the products of the transesterification reaction.

Figure 15:
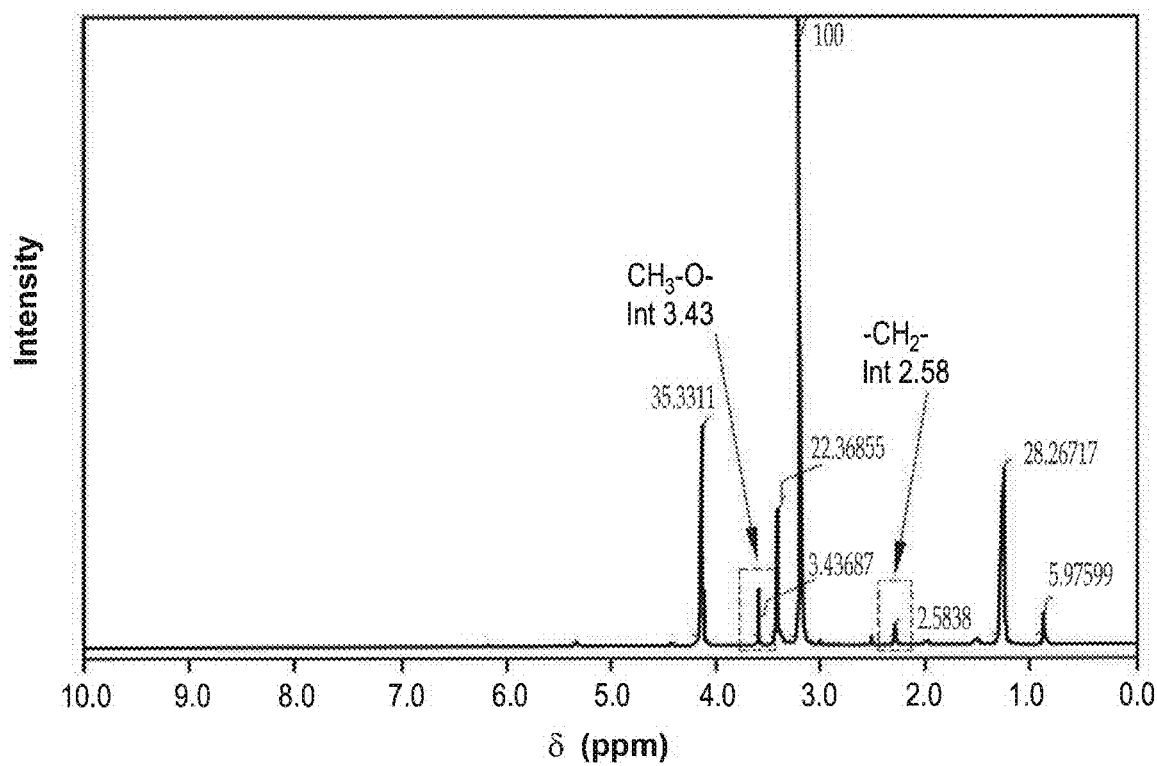

FIG. 15 depicts the nuclear magnetic resonance (NMR) spectrum of the product obtained from the transesterification reaction of used cooking oil using exemplary NiMnO (5%)-$TiO_2$ calcined at 300° C., 1:15 (molar ratio), 180° C. reaction temperature, reaction time of 8 hours.

Figure 16:
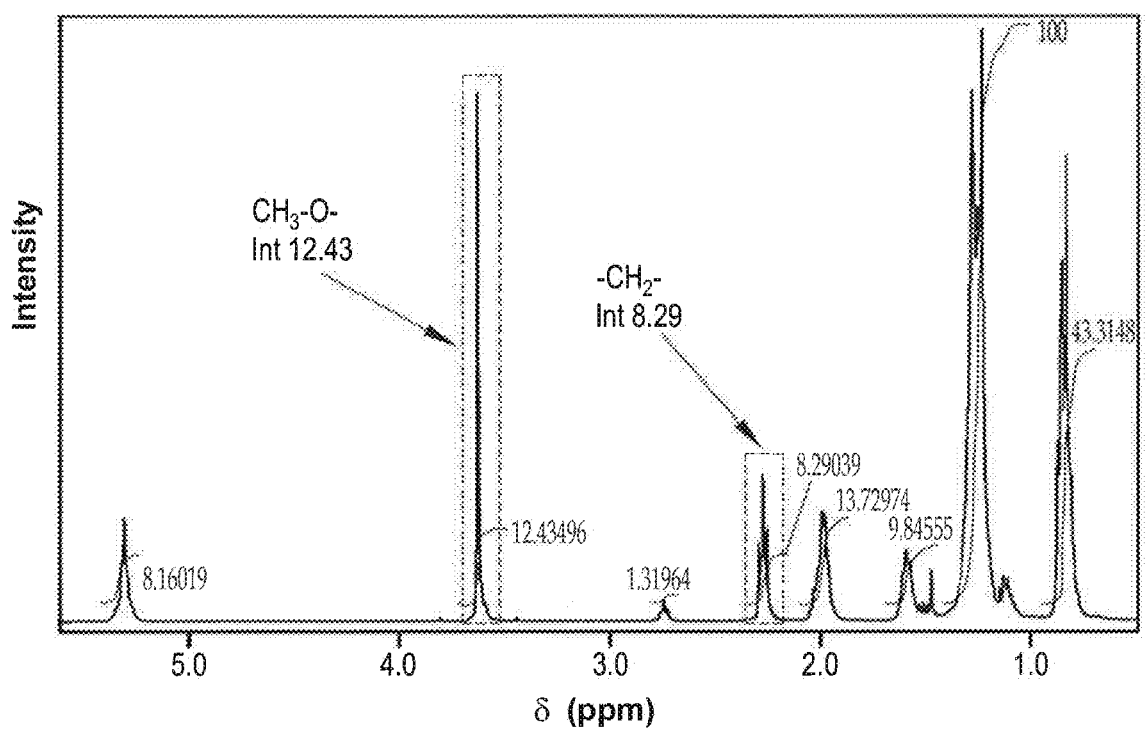

FIG. 16 depicts the NMR spectrum of the product obtained from the transesterification reaction of used cooking oil using exemplary NiMnO (5%)-$TiO_2$ calcined at 400° C., 1:15 (molar ratio), 180° C. reaction temperature, reaction time of 8 hours.

Figure 17:
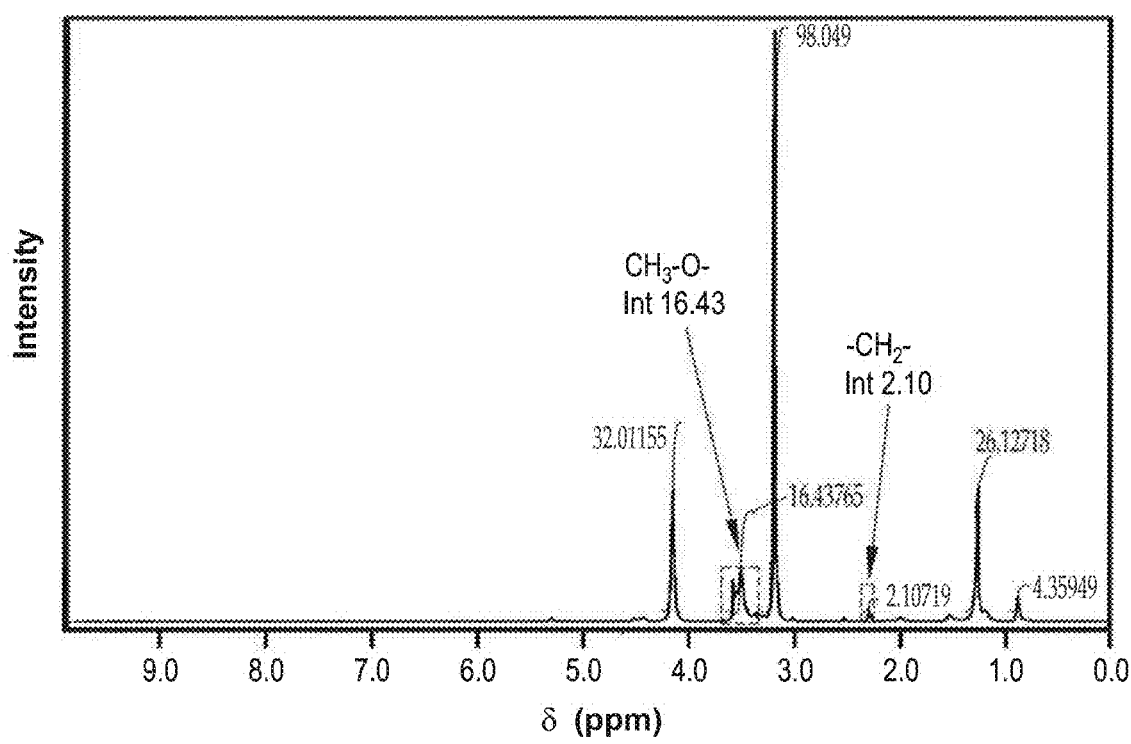

FIG. 17 depicts the NMR spectrum of the product obtained from the transesterification reaction of used cooking oil using exemplary NiMnO (5%)-$TiO_2$ calcined at 500° C., 1:15 (molar ratio), 180° C. reaction temperature, reaction time of 8 hours.

Figure 18:
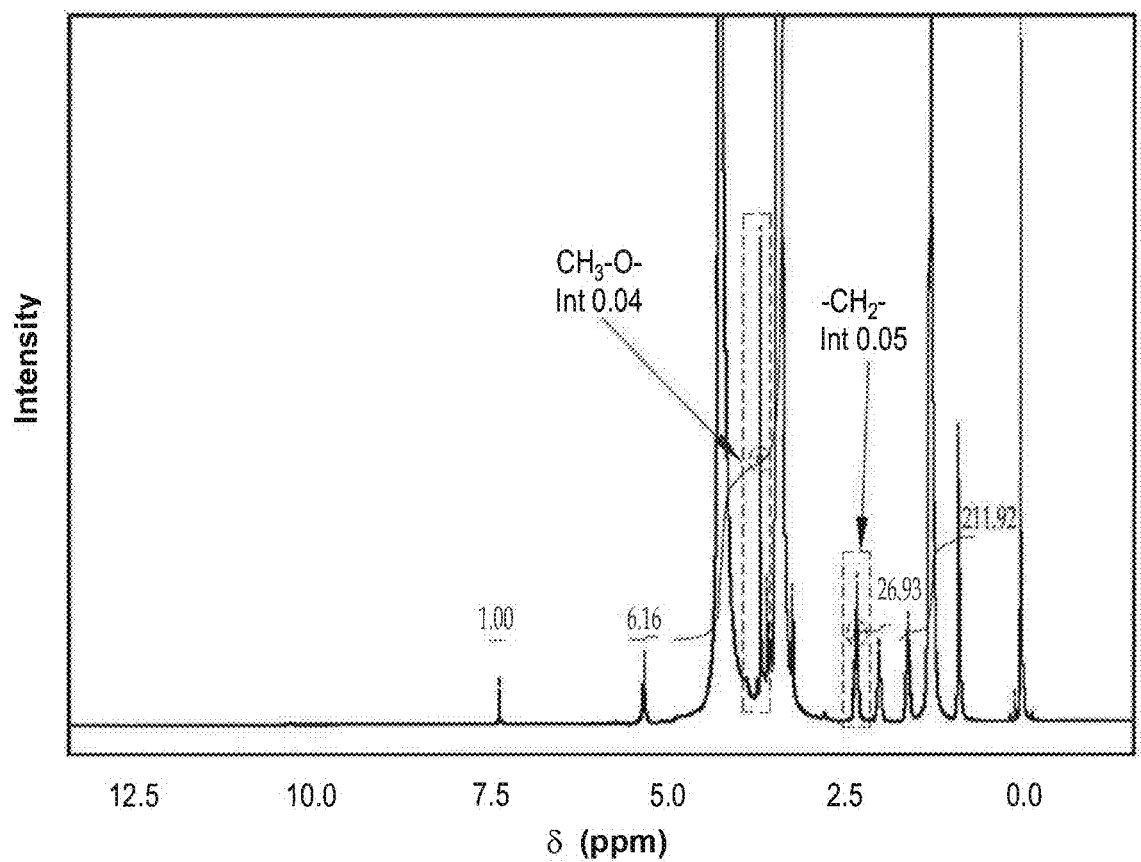

FIG. 18 depicts the NMR spectrum of the product obtained from the transesterification reaction of used cooking oil using exemplary NiMnO (5%)-$TiO_2$ calcined at 400° C., 1:10 (molar ratio), 180° C. reaction temperature, reaction time of 8 hours.

Figure 19:
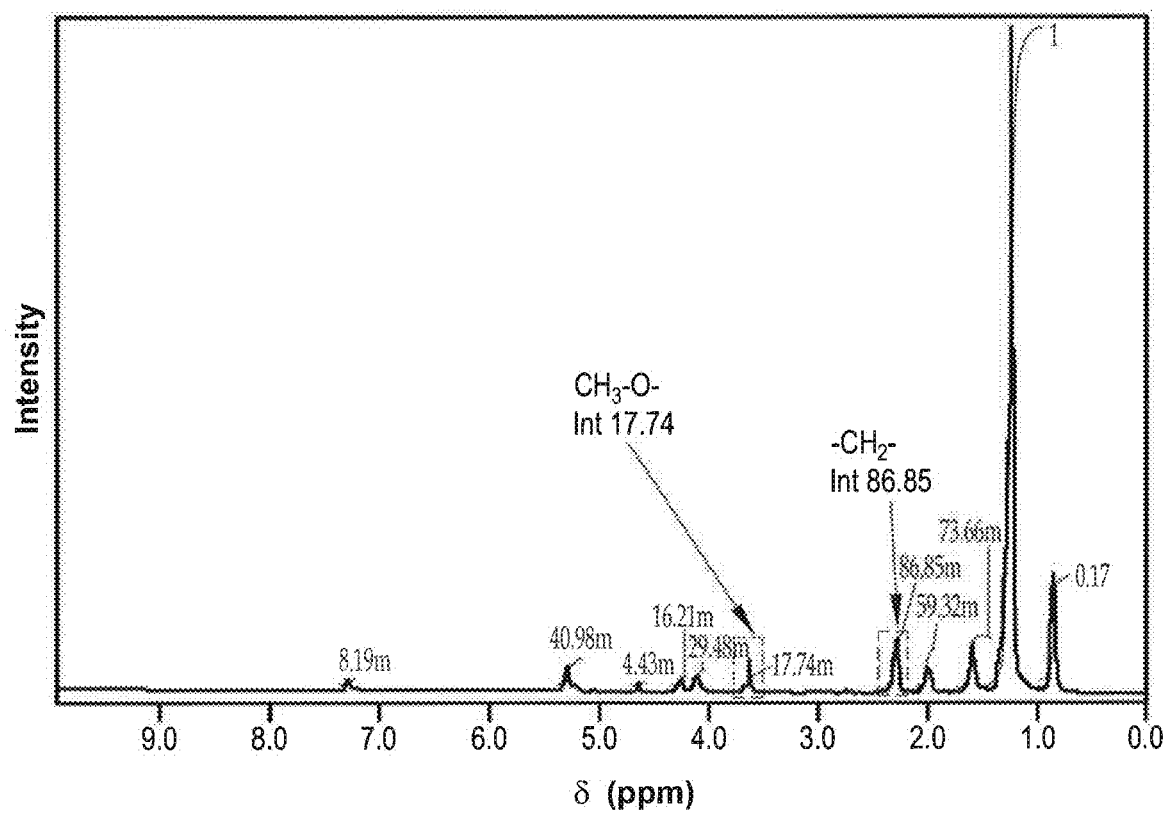

FIG. 19 depicts the NMR spectrum of the product obtained from the transesterification reaction of used cooking oil using exemplary NiMnO (5%)-$TiO_2$ calcined at 400° C., 1:5 (molar ratio), 180° C. reaction temperature, reaction time of 8 hours.

Figure 20:
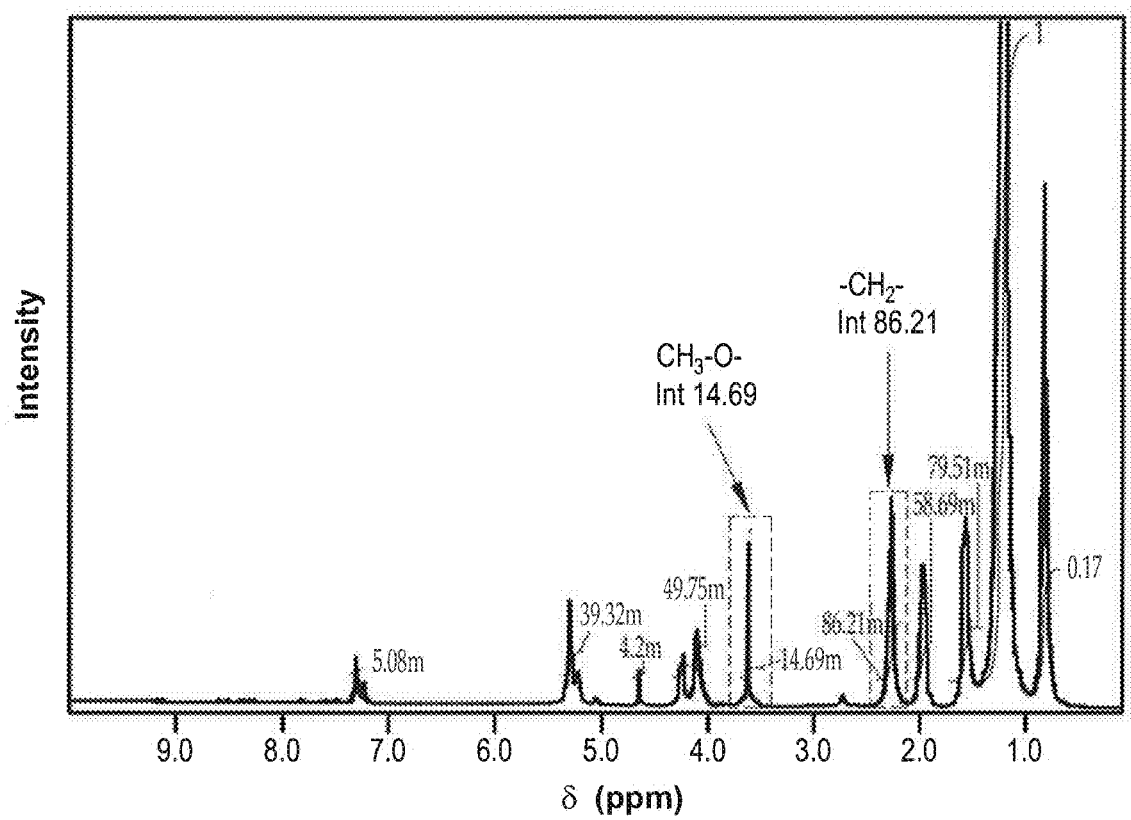

FIG. 20 depicts the NMR spectrum of the product obtained from the transesterification reaction of used cooking oil using exemplary NiMnO (5%)-$TiO_2$ calcined at 400° C., 1:15 (molar ratio), 170° C. reaction temperature, reaction time of 8 hours.

Figure 21:
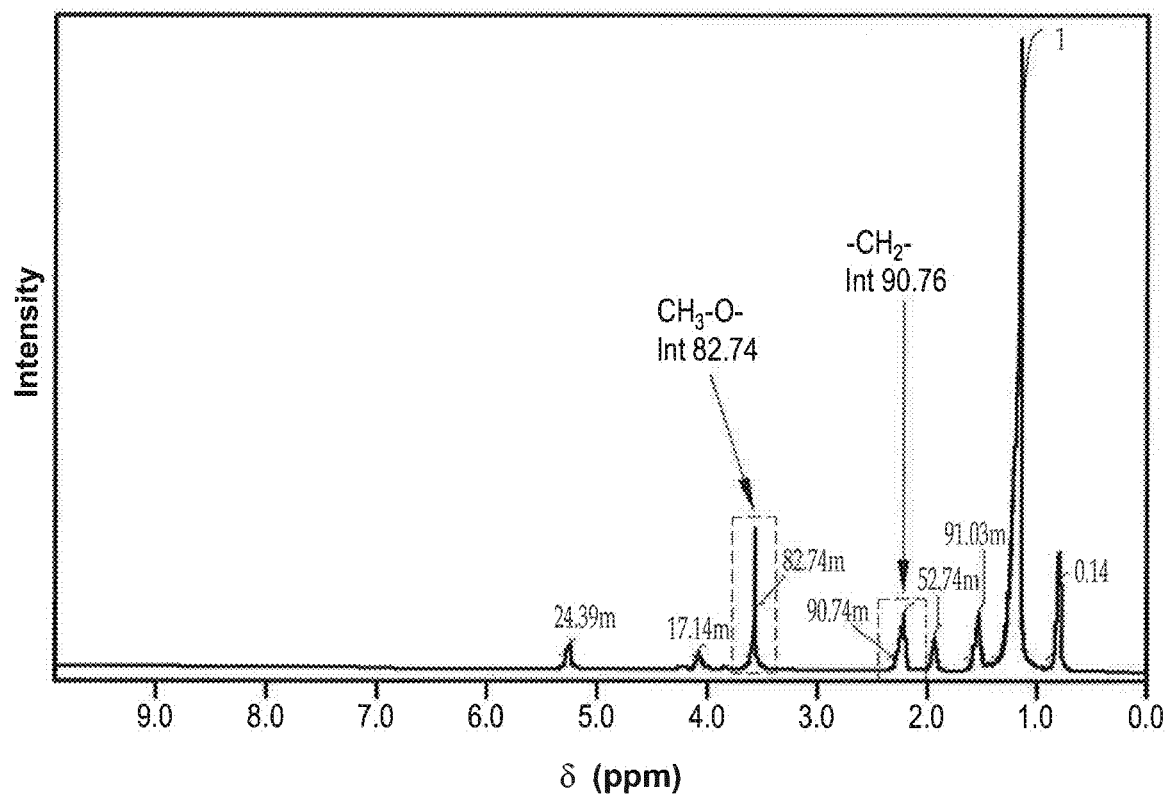

FIG. 21 depicts the NMR spectrum of the product obtained from the transesterification reaction of used cooking oil using exemplary NiMnO (5%)-$TiO_2$ calcined at 400° C., 1:15 (molar ratio), 160° C. reaction temperature.

Figure 22:
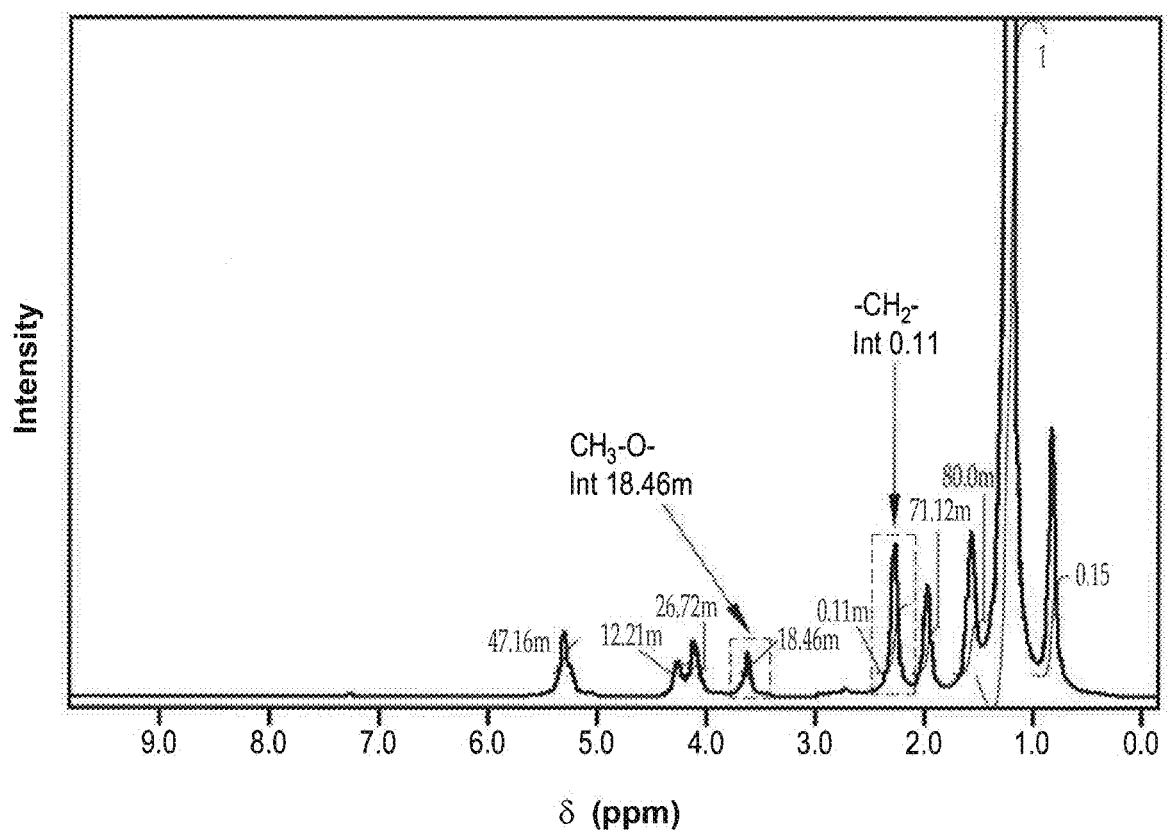

FIG. 22 depicts the NMR spectrum of the product obtained from the transesterification reaction of used cooking oil using exemplary NiMnO (5%)-$TiO_2$ calcined at 400° C., 1:15 (molar ratio), 180° C. reaction temperature, reaction time of 6 hours.

Figure 23:
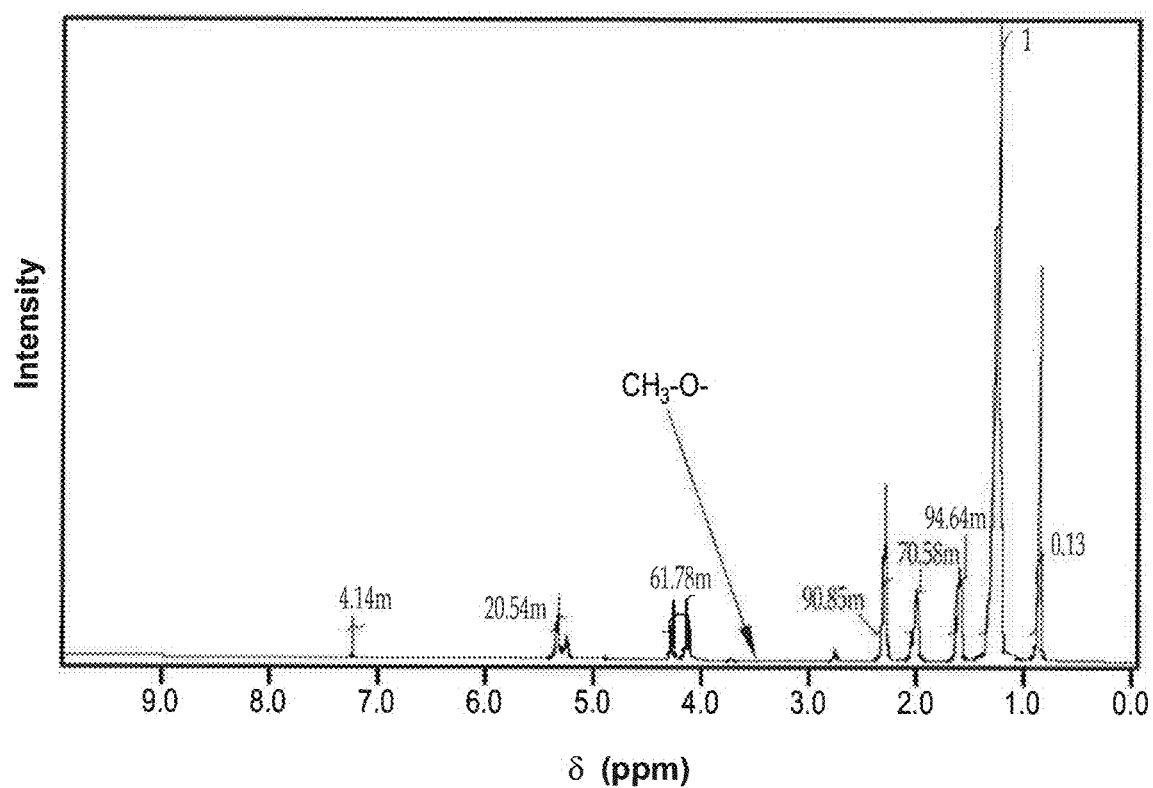

FIG. 23 depicts the NMR spectrum of the product obtained from the transesterification reaction of used cooking oil using exemplary NiMnO (5%)-$TiO_2$ calcined at 400° C., 1:15 (molar ratio), 180° C. reaction temperature, reaction time of 4 hours.

Similar reference characters denote corresponding features consistently throughout the attached drawings.

DETAILED DESCRIPTION OF THE PREFERRED EMBODIMENTS

Figure 1:
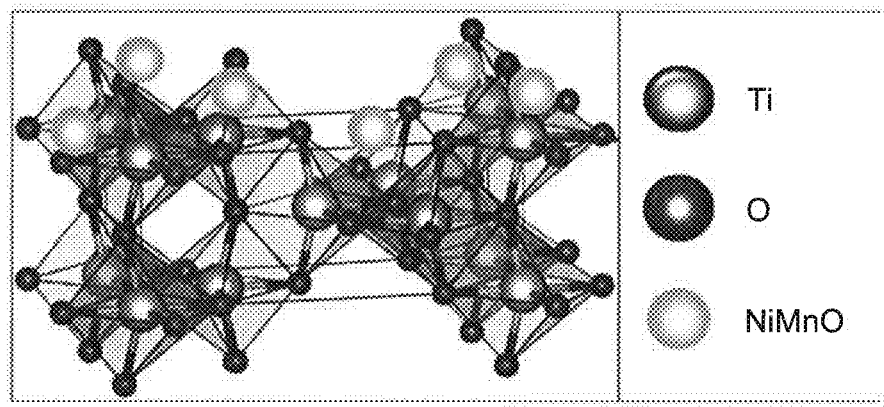
FIG. 1 is a schematic illustrating the presumed structure of the present catalyst including a $TiO_2$ nanoparticle support with NiMnO nanoparticles on a surface thereof.

The present disclosure is directed to a titania ($TiO_2$) supported mixed metal oxide composite structure as a catalyst for transesterification reactions. In a particular embodiment, the mixed metal oxide is NiMnO. The mixed metal oxide is supported by the titania support or adheres to the outer surface of the support (see, e.g., FIG. 1). In an embodiment of the present subject matter, the NiMnO is in the form of nanoparticles, where "nanoparticles" are particles having dimensions less than 500 nm. In a particular embodiment, the mixed metal oxide nanoparticles have a size ranging from about 5 nm to about 100 nm, and particularly from about 5 nm to about 15 nm. In another embodiment, the $TiO_2$ support is also in the form of nanoparticles.

A method for preparing the titania supported mixed metal oxide nanoparticle catalyst, hereinafter referred to interchangeably as "the catalyst", can include the steps of mixing metal salts with $TiO_2$ in solution, adjusting a pH of the mixture to a basic pH; heating the pH adjusted mixture for a first incubation time; collecting a precipitate; and calcining the precipitate to produce the catalyst.

In a particular embodiment, the mixed metal oxide is NiMnO and the metal salts comprise a Ni salt and a Mn salt, e.g., $Ni(NO_3)_2$ and $Mn(NO_3)_2$. The pH may be adjusted to a pH of 9. The heating may be done for several hours to a temperature ranging from about 60° C.-100° C. An additional incubation step at a lower temperature, such as room temperature may follow the heating step. The precipitate may be collected by any suitable means known in the art, such as centrifugation, filtering, and sedimentation. The precipitate may be calcined at a temperature ranging from about 300° C.-500° C. to produce the catalyst.

The physicochemical properties of used oils change considerably after cooking due to various hydrolytic and oxidative reactions, which can adversely affect the transesterification reaction for producing biodiesel. Used oils also contain large amounts of free fatty acids and water content, which are potentially responsible for soaps formation, biodiesel yield reduction, and inhibit the separation of biodiesel. Use of the titania ($TiO_2$) supported mixed metal oxide composite structure as a catalyst for transesterification reactions can avoid these adverse effects for producing biodiesel.

A method for preparing a biodiesel fuel using the catalyst can include mixing a fatty acid source with an alcohol at a molar ratio, adding the catalyst to the mixture, heating the mixture, cooling the mixture and removing the catalyst; and isolating the biodiesel product. In particular, the method may include adding the catalyst to a mixture of used cooking oil and methanol in a molar ratio ranging from a 1:5 ratio to a 1:20 ratio of oil to methanol. In a particular embodiment the molar ratio is 1:15. The mixture is then heated, followed by cooling. After cooling, the catalyst can be removed using a centrifuge. The unreacted methanol can be removed from the reaction mixture by evaporation, using a rotary evaporator. Hexane can then be added to the remaining product, forming a two-layer mixture composed of an organic layer and an aqueous layer. The product biodiesel is in the organic layer. The organic layer is isolated from the aqueous layer. Glycerol can be obtained from the aqueous layer. The biodiesel can be isolated from the organic layer by subjecting the organic layer to evaporation using a rotary evaporator.

The following examples illustrate the present teachings.

EXAMPLES

Example 1

Preparation of Nanosized 5% NiMnO Supported on Titania Catalysts

Exemplary catalysts were prepared according to an embodiment of the present subject matter as follows. 8.596 ml of Ni(NO$_3$)$_2$ was mixed with 9.96 ml of Mn(NO$_3$)$_2$ in a round bottomed flask to form a mixture. 1 g of TiO$_2$ was added to the mixture in the round bottomed flask and the contents of the flask were stirred using a mechanical stirrer. The mixture was pH adjusted by adding NaHCO$_3$ solution (0.5 M) drop-wise until the mixture attained a pH of 9. The pH adjusted mixture was heated to 80° C. and incubated at that temperature under stirring for about 3 hours. The resulting incubated mixture was then further incubated overnight under stirring at room temperature. Then, the incubated mixture was placed under vacuum using a Buchner funnel with Whatman ashless filter paper (grade 41), and the precipitate collected was calcined for 24 hours at one of three different temperatures, 300° C., 400° C. and 500° C., resulting in three exemplary catalysts differentiated by calcining temperature. The prepared exemplary catalysts were used for transesterification of used oil for production of biodiesel.

Example 2

Transesterification of Used Cooking Oil as a Source for the Production of Biodiesel Transesterification of used cooking oil was achieved under various conditions using the above exemplary mixed metal oxide catalyst prepared with various calcining temperatures to demonstrate subsequent catalyst performance.

To determine the effect of calcining temperature on catalyst efficacy, a Teflon digestion cup was charged with 300 mg of each of the exemplary catalysts calcined at one of the three different temperatures 300° C., 400° C. and 500° C., along with 3 g of used cooking oil as a starting material and methanol in a 1:15 molar ratio of used cooking oil to methanol (used cooking oil assumed to have a molecular weight of 890 g/mol). The Teflon digestion cup was capped and sealed in a high pressure autoclave and heated to 180° C. for 8 hours. The reaction mixture was then allowed to cool down before opening the autoclave. After cooling, the catalyst was isolated by centrifugation and the supernatant was transferred into a round bottomed flask, where the unreacted methanol was evaporated using a rotary evaporator. To the remaining product, 20 mL of hexane was added three times for extraction, and the hexane/product mixture was poured into a separating funnel, where an organic layer as well as an aqueous layer could be seen. The organic layer was isolated from the aqueous layer using a separating funnel. Glycerol was obtained from the aqueous layer. The biodiesel was isolated by subjecting the isolated organic layer to evaporation using rotary evaporation. The % conversion to biodiesel product was confirmed by $^1$H-NMR. Any variety of known means of isolating biodiesel from other products of transesterification can alternatively be used.

To determine the effect of temperature on transesterification, a Teflon digestion cup was charged with 300 mg of the exemplary catalyst calcined at 400° C. along with 3 g of used cooking oil as a starting material and methanol in a 1:15 molar ratio. The Teflon digestion cup was capped and sealed in a high pressure autoclave and heated at one of three different reaction temperatures: 160° C., 170° C. and 180° C. for 8 hours. The reaction mixture was then allowed to cool down before opening the autoclave. After cooling, the catalyst was isolated by centrifugation and the supernatant was transferred into a round bottomed flask, where the unreacted methanol was evaporated using a rotary evaporator. To the remaining product, 20 mL of hexane was added three times for extraction, and the hexane/product mixture was poured into a separating funnel, where an organic layer as well as an aqueous layer could be seen. The organic layer was isolated from the aqueous layer. Glycerol was obtained from the aqueous layer. The biodiesel was isolated by subjecting the isolated organic layer to evaporation using rotary evaporation. The % conversion to biodiesel product was confirmed by $^1$H-NMR.

To determine the effect of reaction time on transesterification, a Teflon digestion cup was charged with 300 mg of the exemplary catalyst calcined at 400° C. along with 3 g of used cooking oil as the starting material and methanol in a 1:15 molar ratio. The Teflon digestion cup was capped, sealed, placed in a high pressure autoclave and heated at 180° C. for different reaction times of 4, 6 and 8 hours. The resulting mixtures were treated as mentioned in the previous section related to the effect of calcination temperature.

To determine the effect of molar ratio of MeOH to oil, a Teflon digestion cup was charged with 300 mg of the exemplary catalyst calcined at 400° C. along with 3 g of used cooking oil as the starting material and methanol in different molar ratios of MeH:used cooking oil of 1:5, 1:10 and 1:15, respectively. The resulting mixtures were treated as mentioned in the previous section related to the effect of calcination temperature.

Example 3

Characterization of the Exemplary Catalyst

Figure 2:
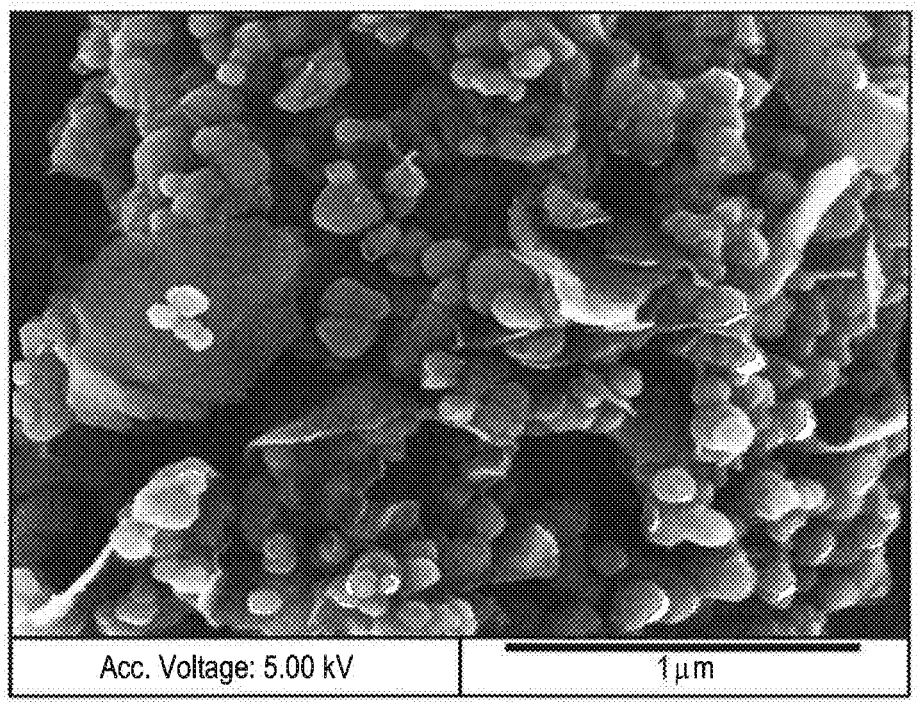
FIG. 2 depicts a scanning electron microscopy (SEM) image of NiMnO (5%)-$TiO_2$ calcined at 300° C.
Figure 3:
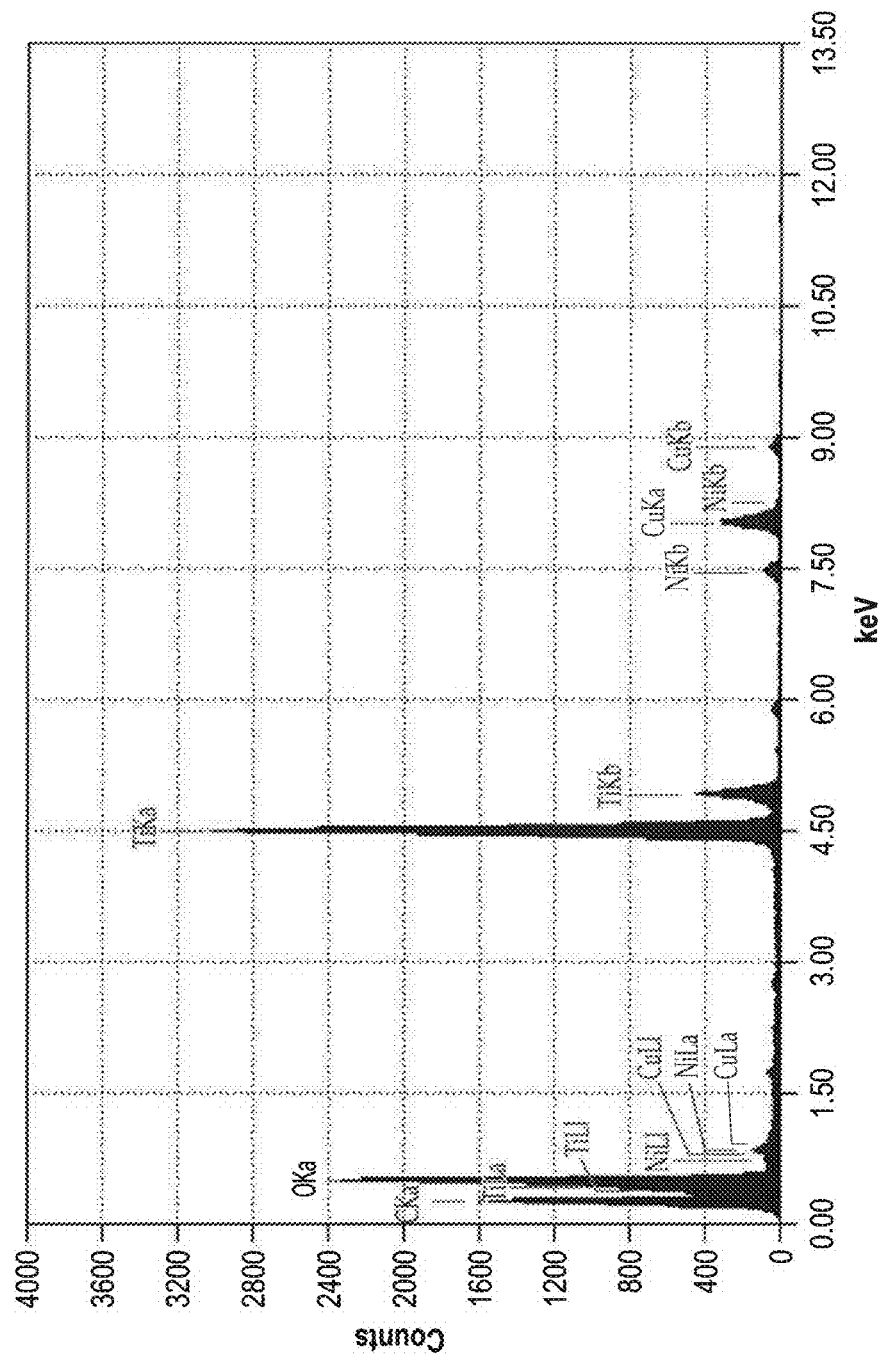
FIG. 3 depicts energy dispersive X-ray (EDX) analysis corresponding to the NiMnO (5%)-$TiO_2$ calcined at 300° C. shown in FIG. 2.
Figure 4:
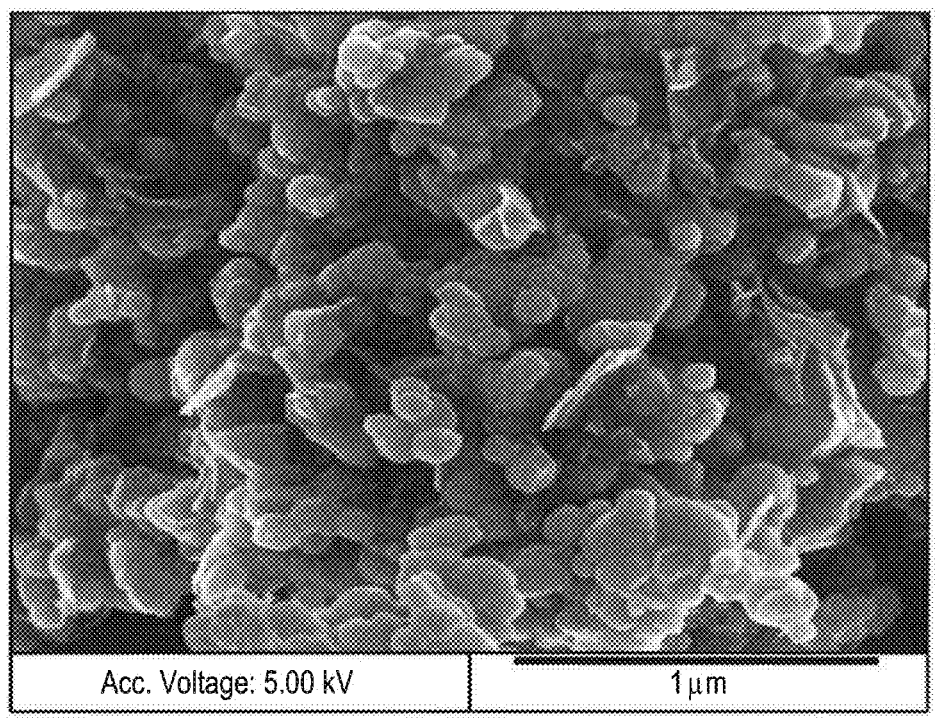
FIG. 4 depicts a SEM image of NiMnO (5%)-$TiO_2$ calcined at 400° C.
Figure 5:
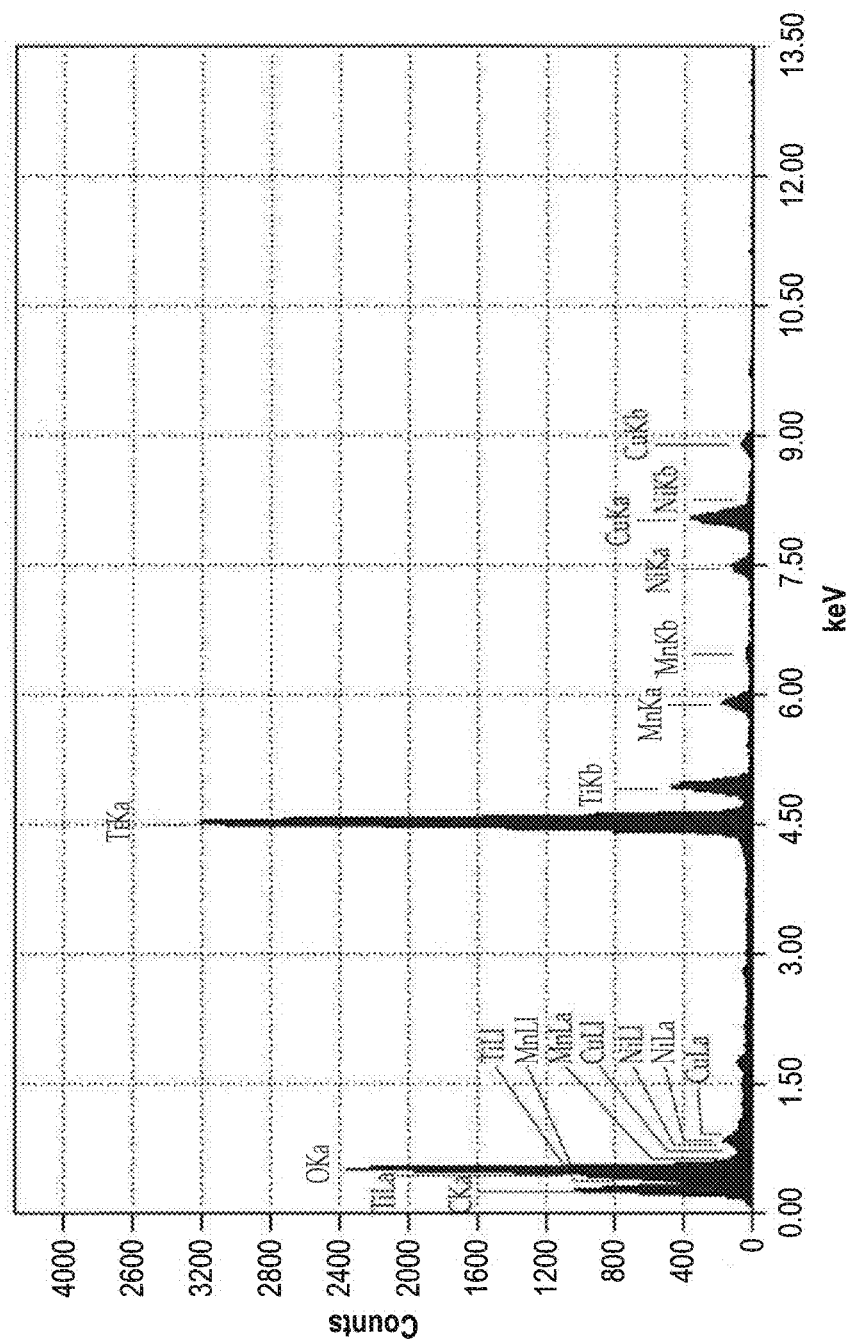
FIG. 5 depicts EDX analysis corresponding to the NiMnO (5%)-$TiO_2$ calcined at 400° C. shown in FIG. 4.
Figure 6:
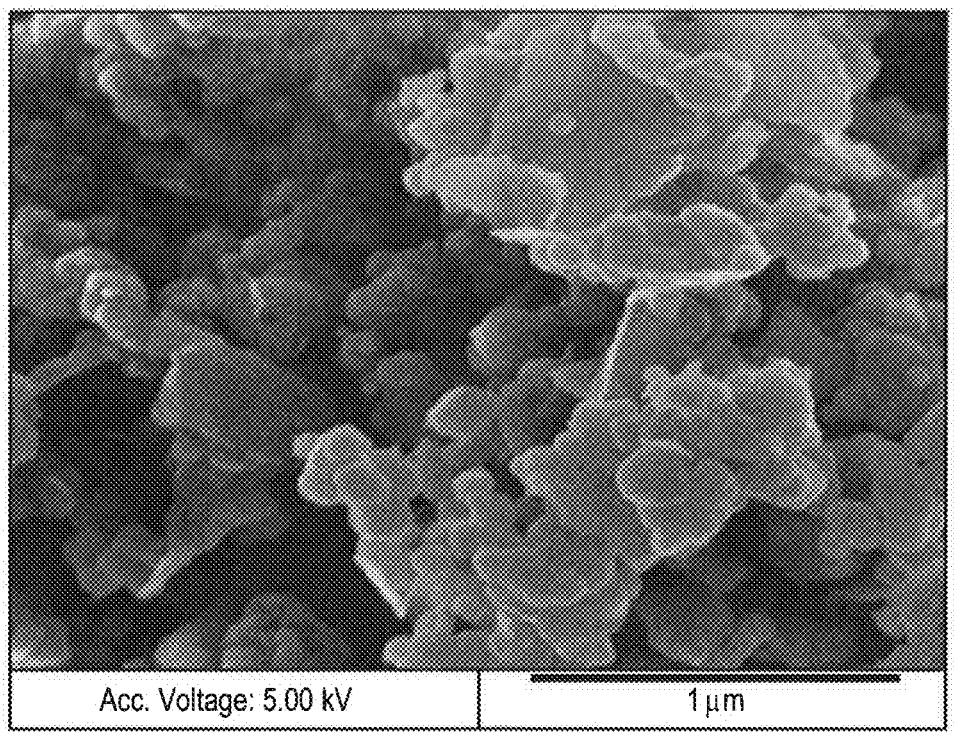
FIG. 6 depicts a SEM image of NiMnO (5%)-$TiO_2$ calcined at 500° C.
Figure 7:
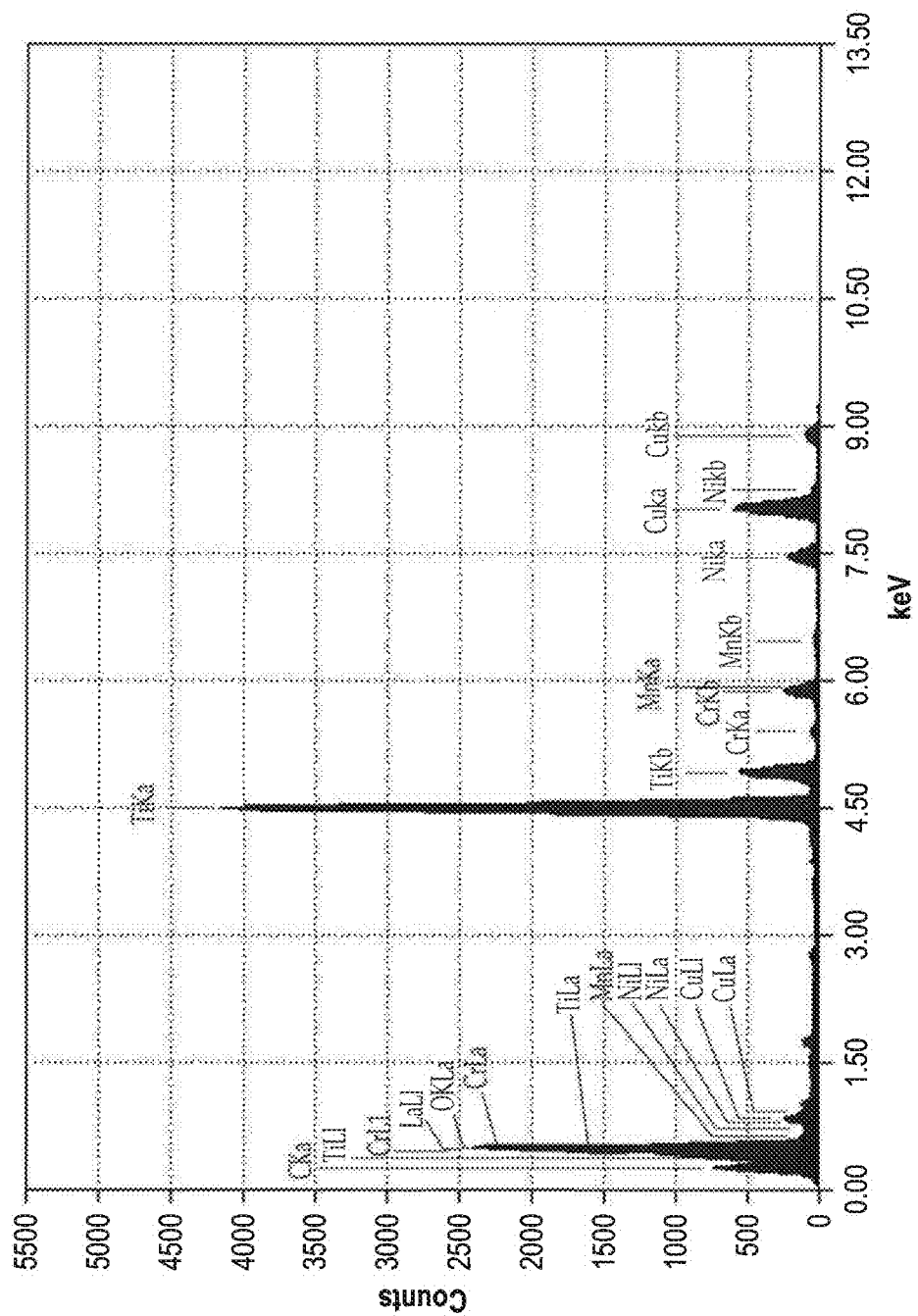
FIG. 7 depicts EDX analysis corresponding to the NiMnO (5%)-$TiO_2$ calcined at 500° C. shown in FIG. 6.

The synthesized catalyst was characterized by electron microscopy to evaluate morphology and particle size. The scanning electron microscopy analysis of the synthesized catalyst calcined at different temperatures 300° C., 400° C. and 500° C. are shown in FIGS. 2, 4 and 6. The observed morphology of the synthesized catalysts is primarily spherical nanoparticles with some larger masses and flakes. The stoichiometric amount of doping was confirmed by EDX analysis to be approximately near the calculated value as shown in FIGS. 3, 5 and 7.

Figure 8A:
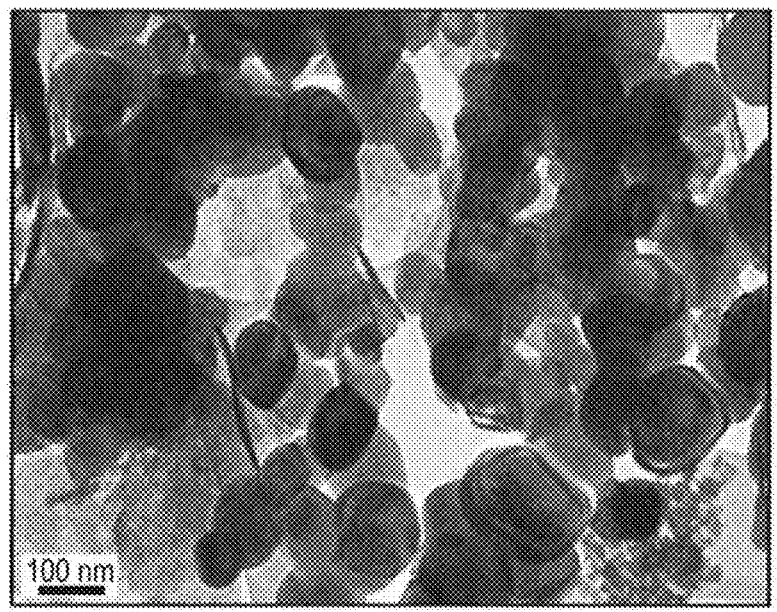
FIGS. 8A-8B provide (8A) a transmission electron microscopy (TEM) image of NiMnO (5%)-$TiO_2$ calcined at 300° C. and (8B) the corresponding particle size distribution graph.
Figure 8B:
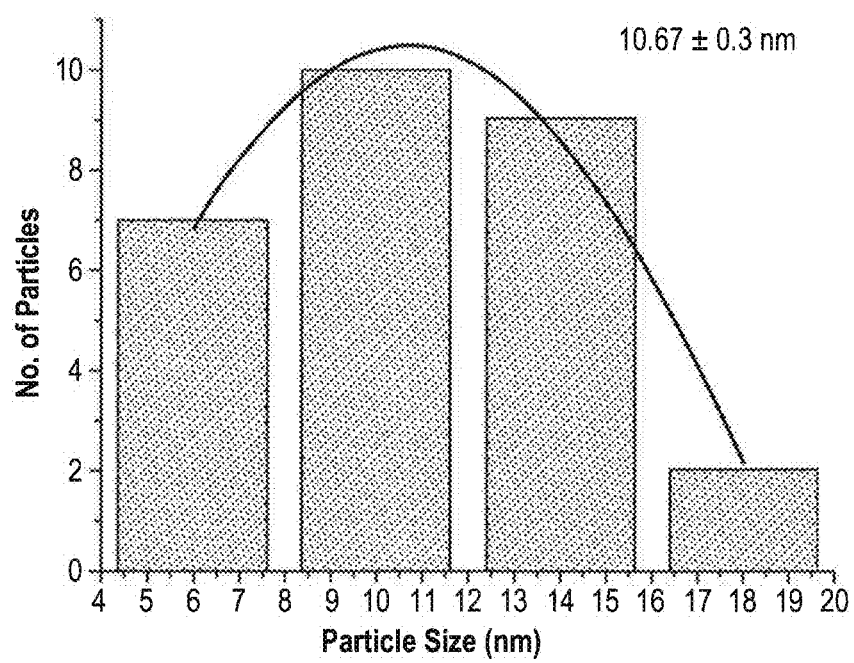
Figure 9A:
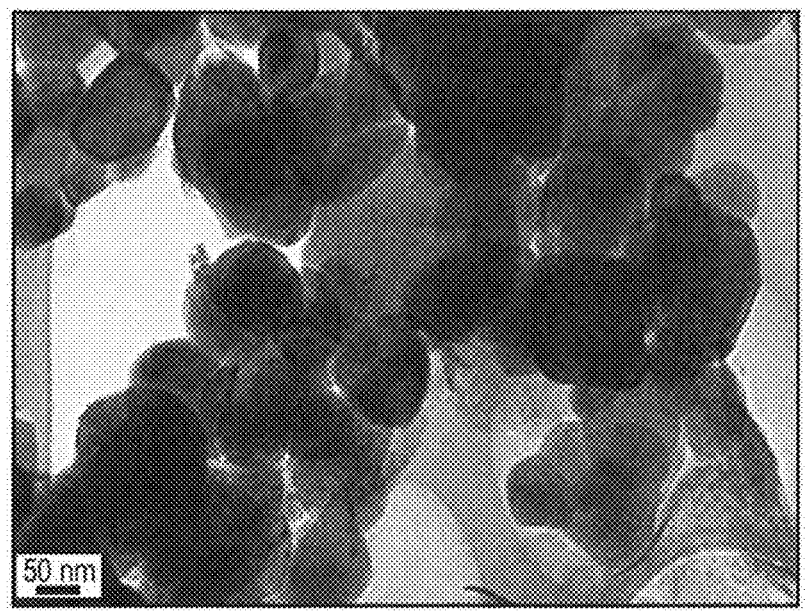
FIGS. 9A-9B provide (9A) a TEM image of NiMnO (5%)-$TiO_2$ calcined at 400° C. and (9B) the corresponding particle size distribution graph.
Figure 9B:
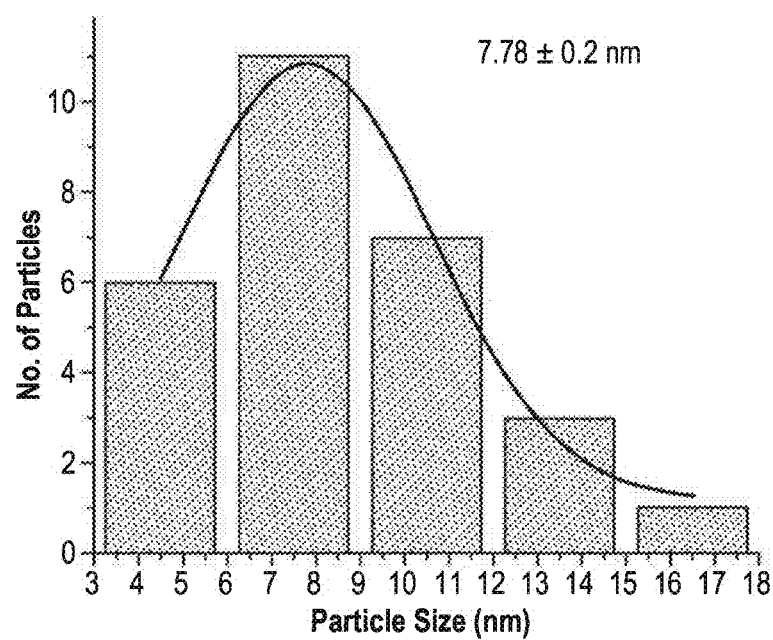
Figure 10A:
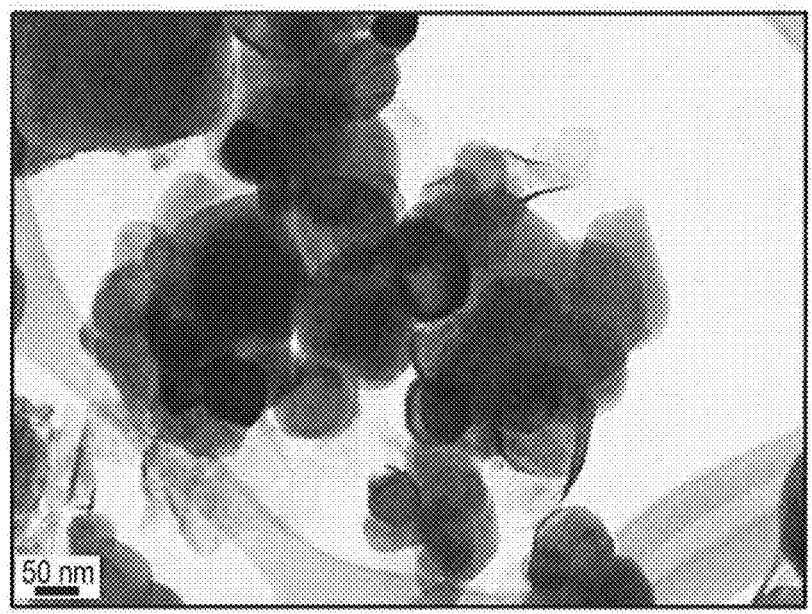
FIGS. 10A-10B provide (10A) a TEM image of NiMnO (5%)-$TiO_2$ calcined at 500° C. and (10B) the corresponding particle size distribution graph.
Figure 10B:
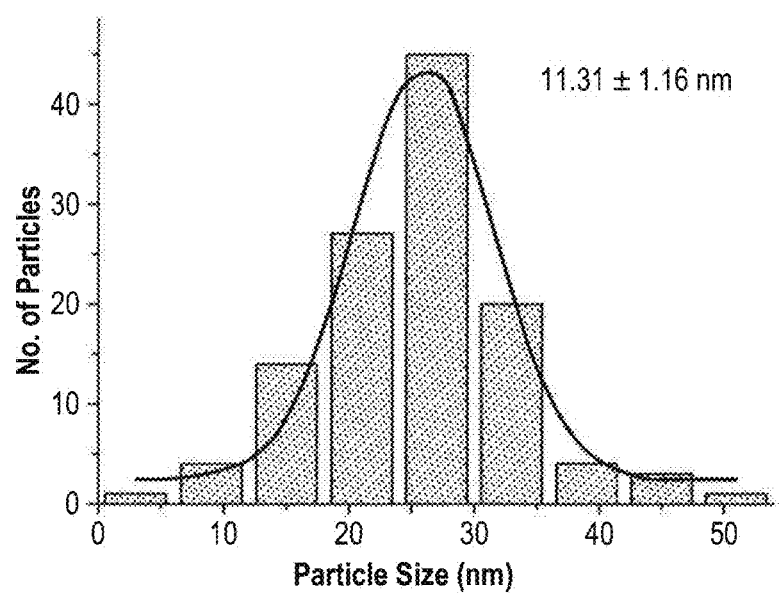

TEM analysis of the exemplary catalysts calcined at different temperatures 300° C., 400° C. and 500° C. was carried out to investigate the shape and size of the nanoparticles as shown in FIGS. 8A, 9A and 10A, respectively. The particle size measurement was carried out employing ImageJ software and the size distribution graph was plotted. It was observed that the average particle size was 10.67 nm, 7.78 nm and 11.31 nm for catalysts calcined at 300° C., 400° C. and 500° C., respectively, as shown in FIGS. 8B, 9B and 0B, respectively. It can be concluded that the calcination temperature has an effect on the particle size of the synthesized catalyst.

Figure 11:
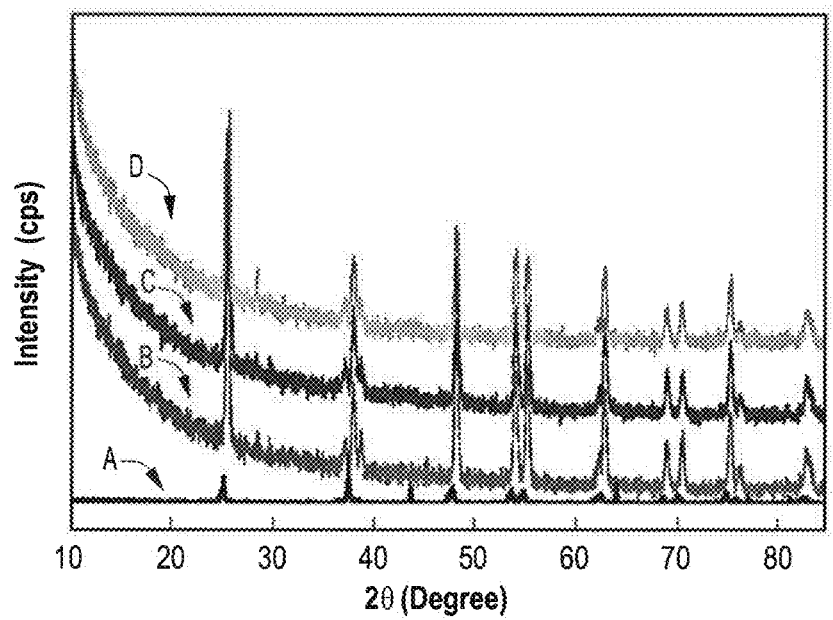
FIG. 11 provides comparisons of the X-ray diffraction (XRD) patterns of bare $TiO_2$ and the synthesized NiMnO (5%)-$TiO_2$ catalyst calcined at different temperatures: a)

FIG. 11 illustrates the X-ray diffraction pattern of the exemplary NiMnO (5%)-TiO$_2$ catalysts calcined at different temperatures 300° C., 400° C. and 500° C. From the XRD pattern. Only TiO$_2$ phases are observed due to the very low amount of NiMnO present.

The exemplary catalyst was subjected to FT-IR spectroscopy and the spectrums obtained are shown in FIG. 12. From the % transmittance peaks in the region between 3450-3350 cm$^{-1}$ characteristic of OH group stretching vibration, the presence of OH groups on the surface of the catalyst are evident, which may be due to the presence of moisture on the surface. The peaks in the region 1600-1300 cm$^{-1}$ are due to the metal/surface binding characteristics, possibly due to metal-oxygen bond vibrations on the surface. The peaks in the region 700-550 cm$^{-1}$ may be due to stretching frequencies between the metal and oxygen atoms.

The exemplary catalysts calcined at temperatures 300° C., 400° C., and 500° C., were subjected to thermal gravimetric analysis (TGA) as shown in FIG. 13. The results are summarized in Table 1.

TABLE 1

Percentage weight loss of catalysts calcined at different temperatures

| Temperature (° C.) | Percentage (%) weight loss | | |
|---|---|---|---|
| | 300° C. | 400° C. | 500° C. |
| 100 | 1.313 | 0.498 | 0.225 |
| 200 | 2.343 | 0.907 | 0.505 |
| 300 | 2.998 | 1.238 | 0.73 |
| 400 | 4.348 | 1.579 | 0.899 |
| 500 | 4.984 | 1.945 | 1.05 |
| 600 | 5.554 | 2.469 | 1.305 |
| 700 | 6.032 | 2.917 | 1.784 |
| 800 | 6.454 | 3.302 | 2.117 |

As shown in FIG. 13, the prepared catalysts are stable up to 800° C. The maximum loss in weight was found to be 6.4% for the exemplary catalyst calcined at 300° C. However, a weight loss of about 3.3 and 2.1 was found for the catalyst calcined at 400° C. and 500° C., respectively. The obtained results suggest that the catalyst is thermally stable up to about 800° C.

Example 4

Catalytic Conversion Efficiency of the Exemplary Catalysts

In order to optimize the percentage of nickel manganese mixed oxide to be supported on the titania for the best catalytic performance for transesterification, a series of catalysts with varying percentage of NiMnO and titania were synthesized and were evaluated for their catalytic property. The mol % of NiMnO to titania was varied from 95 mol % to 5 mol %, and, while all tested ratios were effective as catalysts for the transesterification reactions of used cooking oils, the 5 mol % was found to have particularly efficient catalytic performance (data not shown).

The reaction was carried out using a high pressure Teflon lined steel autoclave. In a typical transesterification reaction, 3 g of used edible oil (for assumed molecular weight of used cooking oil of 890 g/mol, this corresponds to ~16.85 mMol oil), methanol in a molar ratio to the oil, as specified above, and catalyst (in amounts of 3-10 wt % of oil) were added into a teflon-lined steel autoclave (100 ml). The reaction was carried out for about 8 hours at 180° C. The autoclave was then allowed to cool to room temperature and the hexane was added to the reaction mixture. The catalyst was separated from the reaction mixture by centrifugation and filtration. The reaction mixture was then poured into a separating funnel and the two layers were collected separately. The lower layer of the layers being unreacted alcohol with glycerol and the upper layer of the two layers being fatty acid alkyl esters, which form when the conversions from oil is at least around 75%-80%. Otherwise, an alcohol layer lies on top of an ester layer. The unreacted alcohol is removed by vacuum distillation. After removal of unreacted alcohol, the reaction mixture contains transesterified product (fatty acid alkyl esters), glycerol and unreacted oil. In all cases, glycerol settled at the bottom. Hexane (40 ml) was added. The oil and the transesterified product readily went into the hexane layer, while the glycerol remained as a separate layer. The weight of glycerol was determined. The fatty acid esters and unconverted oil were separated by distilling out the ether portion.

The products of biodiesel can be analyzed by different techniques. In particular, the yield of transesterification reactions can be determined by $^1$H NMR analysis (Gelbard G., 1995). The signal due to methylene protons adjacent to the ester group in triglycerides appear at 2.3 ppm. After the reaction, the methoxy protons of the methyl esters appear at 3.7 ppm, as illustrated in FIG. 14.

The areas of the signals of methylene and methoxy protons can be used to monitor the yield of transesterification (Eq. 1).

$$C = 100 \times [2A(ME)/3A(CH_2)] \quad \text{[Eq. 1]}$$

C is the percentage conversion of triglycerides to corresponding methyl esters. A(ME) is the integration value of the protons of the methyl esters (the strong singlet) and A(CH$_2$) is the integration value of the methylene protons. The factors 2 and 3 are derived from the fact that the methylene carbon possesses 2 protons and the alcohol (methanol derived) carbon has three attached protons. The products were identified by $^1$H and $^{13}$C NMR (400 MHz, JEOL Eclise 400) and FTIR spectroscopies.

To study the effect of calcination temperature on the catalytic performance of the synthesized catalyst, the NiMnO(5%)-TiO$_2$ catalyst was calcined at different temperatures, i.e., 300° C., 400° C. and 500° C., respectively for catalysts, the results gave 83%, 99.6%, and 88.8%. The percentage conversion of triglycerides to corresponding methyl esters are summarized in Table 2 and the $^1$HNMR spectrums obtained are given in FIGS. 15, 16 and 17.

TABLE 2

Effect of calcination temperature on the catalytic properties of NiMnO(5%)—TiO$_2$

| Entry | Catalyst | Temperature ° C. | SA (m$^2$g$^{-1}$) | Conversion (%) | Glycerol (g) | Selectivity (%) |
|---|---|---|---|---|---|---|
| 1 | NiMnO (5%)—TiO$_2$ | 300° C. | 21.59 | 83.3 | 2.141 | — |
| 2 | NiMnO (5%)—TiO$_2$ | 400° C. | 19.40 | 99.6 | 0.792 | >99 |
| 3 | NiMnO (5%)—TiO$_2$ | 500° C. | 17.28 | 88.8 | 2.211 | |

In FIG. 15, the signal at δ 2.27 ppm has an integration value of 2.58 and at δ 3.57 ppm has an integration value of 3.43, indicating the yield obtained was 83.3%. In FIG. 16, the signal at δ 2.27 ppm has an integration value of 8.29 and at δ 3.61 ppm has an integration value of 12.43, indicating the yield obtained was 99.6%. In FIG. 17, the signal at δ 2.26 ppm has an integration value of 2.10 and at δ 3.51 ppm has an integration value of 16.43, indicating the yield obtained was 88.8%.

Having studied the effect of oil:methanol (molar) ratios of 1:5, 1:10, 1:15 using the exemplary catalyst calcined at 400° C., it was found that the best conversion efficiency occurred at a ratio of 1:15 of (oil:methanol) for triglycerides to corresponding methyl esters, while the lowest conversion occurred at a ratio of 1:5. These results are summarized in Table 3 and shown in FIGS. 18 and 19.

TABLE 3

Effect of oil:methanol molar ratio on conversion efficiency (catalyst calcined at 400° C.)

| Entry | Oil:Methanol molar ratio | Temperature (° C.) | Time (hours) | Conversion (%) | Selectivity (%) |
|---|---|---|---|---|---|
| 1 | 1:15 | 180 | 8 | 99.6 | >99 |
| 2 | 1:10 | 180 | 8 | 66.2 | |
| 3 | 1:05 | 180 | 8 | 13.6 | |

In FIG. 18, the signal at δ 2.30 ppm has an integration value of 0.06(26.93) and at δ 3.58 ppm has an integration value of 0.04(6.16), indicating the yield obtained was 53.33 (13.6) %. In FIG. 19, the signal at δ 2.26 ppm has an integration value of 86.85 and at δ 3.60 ppm has an integration value of 17.74, indicating the yield obtained was 66.2%.

Having studied the effect of reaction temperature on NiMnO (5%)-TiO$_2$ calcined at 400° C. on the catalytic performance of the synthesized catalyst. It was found that the best reaction temperature is 180° C. to convert the oil of triglycerides to corresponding methyl esters as summarized in Table 4 and shown for 170° C. and 160° C., respectively, in FIGS. 20 and 21.

TABLE 4

Effect of reaction temperature on NiMnO (5%)-TiO$_2$ at 400° C.

| Entry | Oil:Methanol molar ratio | Temperature (° C.) | Time (hours) | Conversion (%) | Selectivity (%) |
|---|---|---|---|---|---|
| 1 | 1:15 | 180 | 8 | 99.6 | >99 |
| 2 | 1:15 | 170 | 8 | 66.6 | |
| 3 | 1:15 | 160 | 8 | 60.7 | |

In FIG. 20, the signal at δ 2.27 has an integration value of 86.21(68.21) ppm and at δ 3.62 has an integration value of 14.69 ppm, indicating the yield obtained was 11.35(66.6) %. In FIG. 21, the signal at δ 2.22 has an integration value of 90.76 ppm and at δ 3.58 has an integration value of 82.74 ppm, indicating the yield obtained was 60.7%.

Reaction time was shown to affect the catalytic performance of the exemplary catalysts, particularly as tested for the NiMnO (5%)-TiO$_2$ calcined at 400° C. A best reaction time of 8 hours to convert the 1:15 oil:methanol triglycerides to corresponding methyl esters. No appreciable conversion appears at 4 hours, so for the particular conditions tested here, greater than 4 hours is required for the reaction to substantially progress. The results are summarized in Table 5 and shown in NMR spectra for 6 and 4 hours in FIGS. 22 and 23, respectively.

TABLE 5

Effect of reaction time on catalytic performance of NiMnO (5%)-TiO$_2$ (400° C.)

| Entry | Oil:Methanol molar ratio | Temperature (° C.) | Time (hours) | Conversion (%) | Selectivity (%) |
|---|---|---|---|---|---|
| 1 | 1:15 | 180 | 8 | 99.6 | >99 |
| 2 | 1:15 | 180 | 6 | 10.4 | |
| 3 | 1:15 | 180 | 4 | No product | |

In FIG. 22, the signal at δ 2.27 ppm has an integration value of 0.11 and at δ 3.61 ppm has an integration value of 18, indicating the yield obtained was 11.18(10.4) %.

It is to be understood that the titania supported mixed metal oxide nanoparticles useful as catalysts for transesterification reactions and related compositions and methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A catalyst for transesterification consisting of a mixed metal oxide on a surface of a TiO2 support, wherein the mixed metal oxide is NiMnO nanoparticles having been calcined at between 300° C.-500° C. and have an average particle size of between 7.78 nm and 11.31 nm for catalysts calcined at 300° C.-500° C.

2. The catalyst of claim 1 wherein a mass ratio of NiMnO to TiO2 ranges from about 1:20 to about 20:1.

3. The catalyst of claim 2 wherein a mass ratio of NiMnO to TiO2 in the catalyst is 1:19.

\* \* \* \* \*